United States Patent [19]

Sheiman et al.

[11] Patent Number: 5,039,130
[45] Date of Patent: Aug. 13, 1991

[54] SLED

[76] Inventors: Lawrence S. Sheiman; Jonathan C. Sheiman, both of 7310 Marina Pacifica Dr. South, Long Beach, Calif. 90803

[21] Appl. No.: 294,169

[22] Filed: Jan. 6, 1989

[51] Int. Cl.$^5$ ................................................ B62B 9/04
[52] U.S. Cl. ..................................... 280/845; 280/28; 280/28.14
[58] Field of Search ...................... 280/845, 900, 28.14, 280/23.1, 28, 18.1, 14.2, 841

[56] References Cited

U.S. PATENT DOCUMENTS

| | | | |
|---|---|---|---|
| 126,108 | 4/1972 | Townsend | 280/23.1 |
| 1,423,732 | 7/1922 | Pix | 280/23.1 |
| 3,606,366 | 1/1969 | Engelberger | 280/841 |
| 4,025,082 | 5/1977 | Lummus | 280/12 H |

Primary Examiner—David M. Mitchell
Assistant Examiner—Richard Camby
Attorney, Agent, or Firm—Blakely, Sokoloff, Taylor & Zafman

[57] ABSTRACT

An improved sled provides a support member having an ice block removably coupled to its underside. The ice block is coupled to the support member by an adjustable retention means. A pair of support blocks are connected to the underside of the support member and have threaded holes disposed therethrough. Locking screws are placed through each of the holes, and are coupled to compression blocks. As the locking screws are turned, the compression blocks move inwardly, thereby gripping the ice block. As the ice melts, the locking screws can be tightened, so as to maintain a firm grip on the ice. In the preferred embodiment, the support member is formed in the shape of a seat.

9 Claims, 3 Drawing Sheets

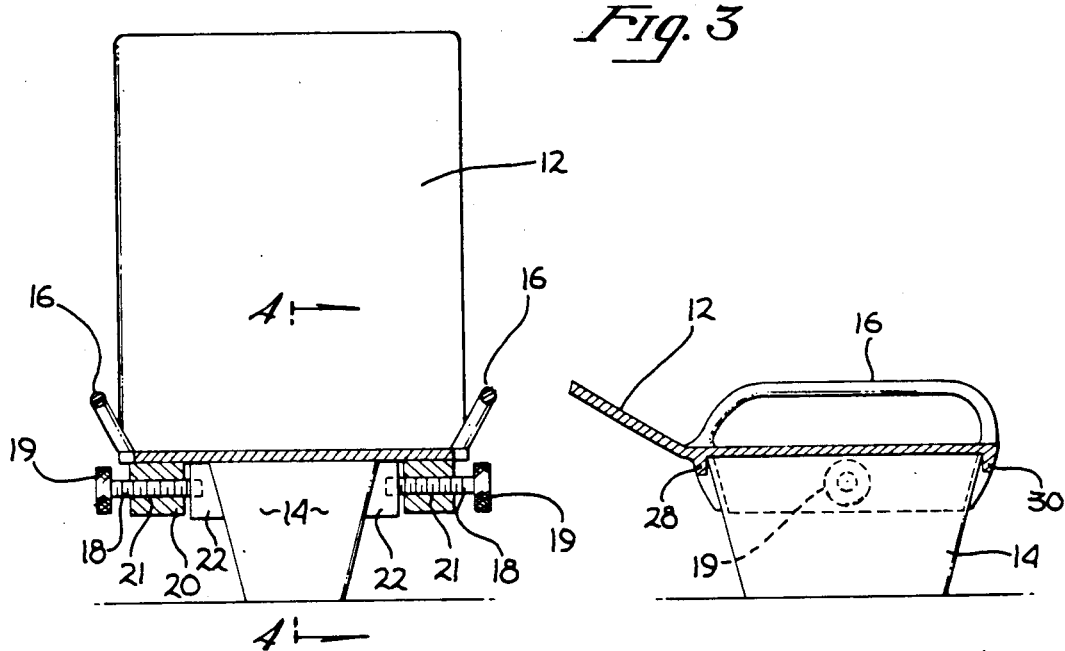
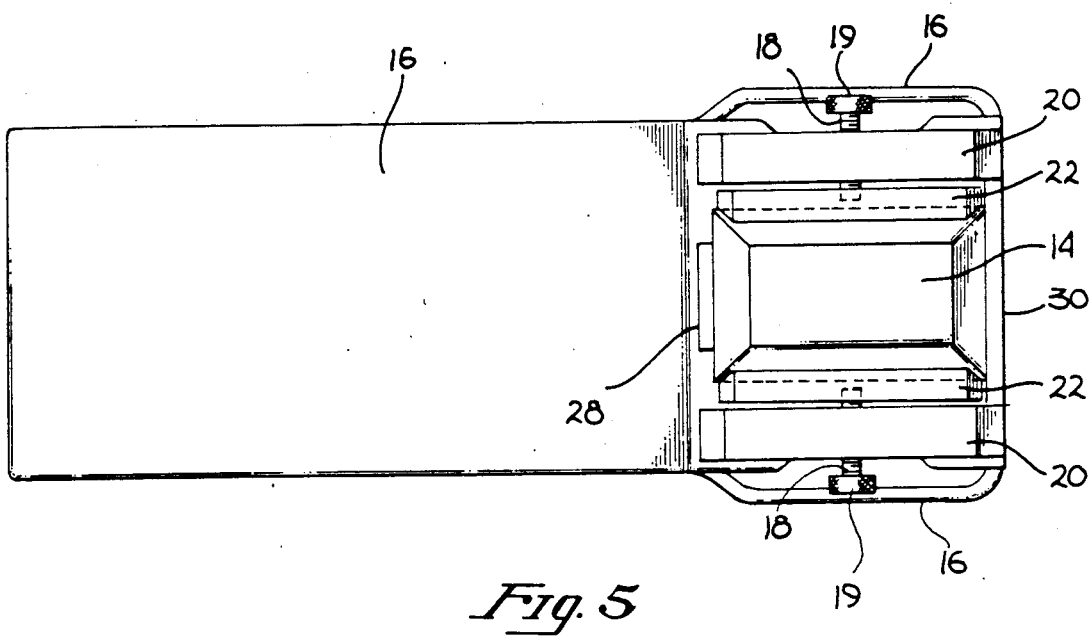

SLED

FIELD OF THE INVENTION

This invention relates to the field of outdoor recreational devices, and more particularly to an all-purpose, all-weather sled.

BACKGROUND OF THE INVENTION

During the winter months, a popular recreational activity for children and adults, is riding a sled down snow-covered hillsides. Naturally, this activity can only be practiced in an area where the climate is cold enough to allow for snowfall. Consequently, many people in areas with a warm climate are unable to enjoy this activity unless they travel to colder climates or mountainous areas.

A common form of sled that is used in the prior art typically consists of a flat surface mounted on top of runners. These runners are typically made of metal and have a sharpened edge which rides along the surface of the snow. The edges are sharpened in order to minimize the amount of friction between the sled and the hillside. Since small children often use sleds, the sharpened runners can pose a threat of injury. This injury can occur simply when a child handles the sled in an improper manner. Even more dangerous situations can arise when a person riding the sled allows the sled to get out of control, and collides with another person on the hillside.

SUMMARY OF THE INVENTION

It has been found that the aforementioned difficulties may be overcome through the use of an improved sled which is described herein. The new aspect of the sled is an undersurface comprising a block of ice. The use of an ice block provides several advantages over the prior art. As the ice melts, it provides a thin, friction-free layer for the sled to travel on. This allows the sled to be used in all types of weather and on all types of surfaces. Thus, the sled will not be limited to use on snow-covered hillsides. For example, it can be used on grassy surfaces in warm weather or on any other inclined area.

The use of the ice block also obviates the need for the sharpened metal runners of prior art sleds. This results in a sled which is safer to use for both the rider and any other person near the area where the sled is in use. It also results in reduced manufacturing costs for the sled since it is no longer necessary to include the runners.

Since the ice block will naturally melt with use, the present invention has the additional advantage of being smaller than prior art sleds. Where prior art sleds consisted of a flat surface or seat and the metal runners, the present invention consists primarily of the seat when not in use. Thus, less room is needed to store the sled. Also, the transportation of the sled to and from the sledding area is made easier.

BRIEF DESCRIPTION OF DRAWINGS

FIG. 3 is a front cutaway view of the seat of the present invention taken along the lines 3—3 showing the preferred method of mounting the ice block to the seat.

FIG. 4 is a cutaway view of the seat used in the present invention.

FIG. 5 is a bottom view of the seat of the present invention showing the mechanism for mounting the ice block to the seat.

DETAILED DESCRIPTION OF THE INVENTION

An improved sled for recreational use is described. In the following description, for purposes of explanation, specific elements such as the ice block clamping means are described in detail in order to provide a thorough understanding of the present invention. In other instances, well known elements and methods of manufacture are not set forth in detail so as not to obscure the present invention unnecessarily.

Figure 1:
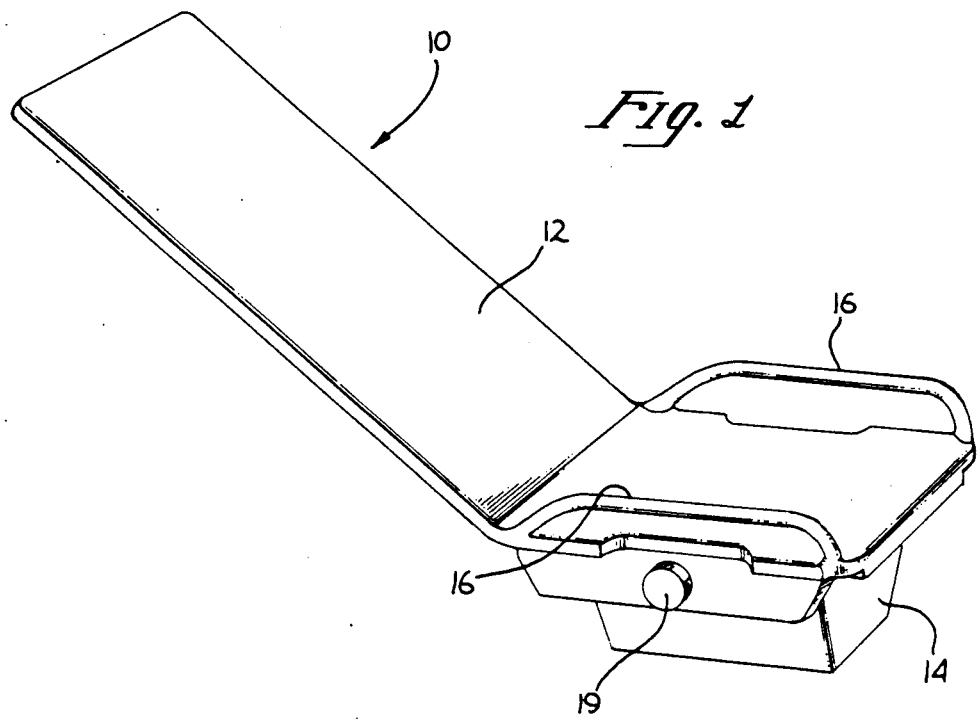
FIG. 1 is a perspective view of the preferred embodiment of the present invention.
Figure 2:
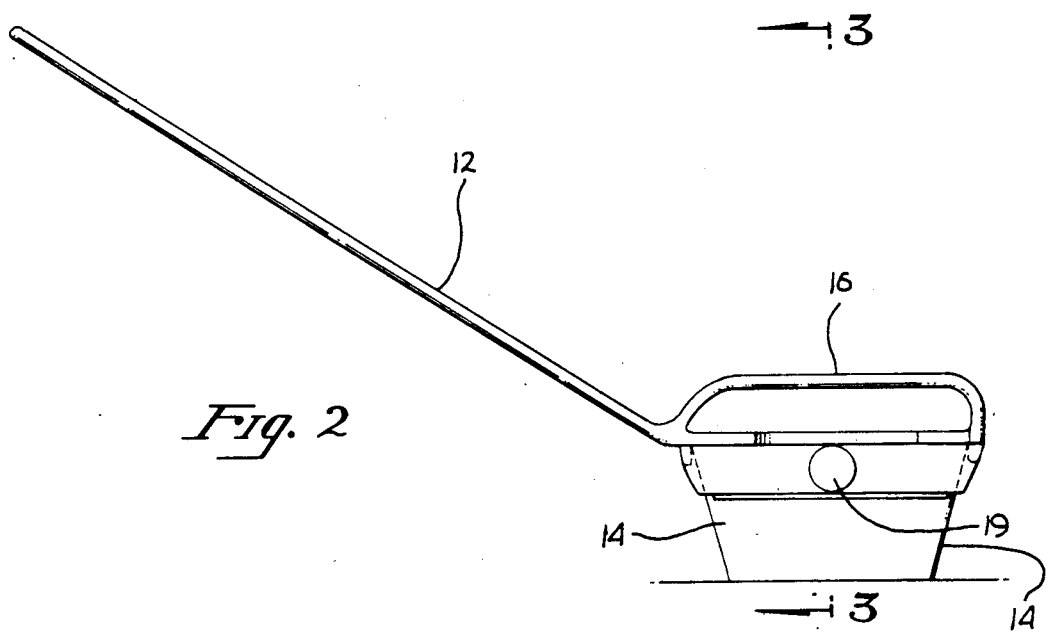
FIG. 2 is a side view of the present invention with the ice block.
Figure 6:
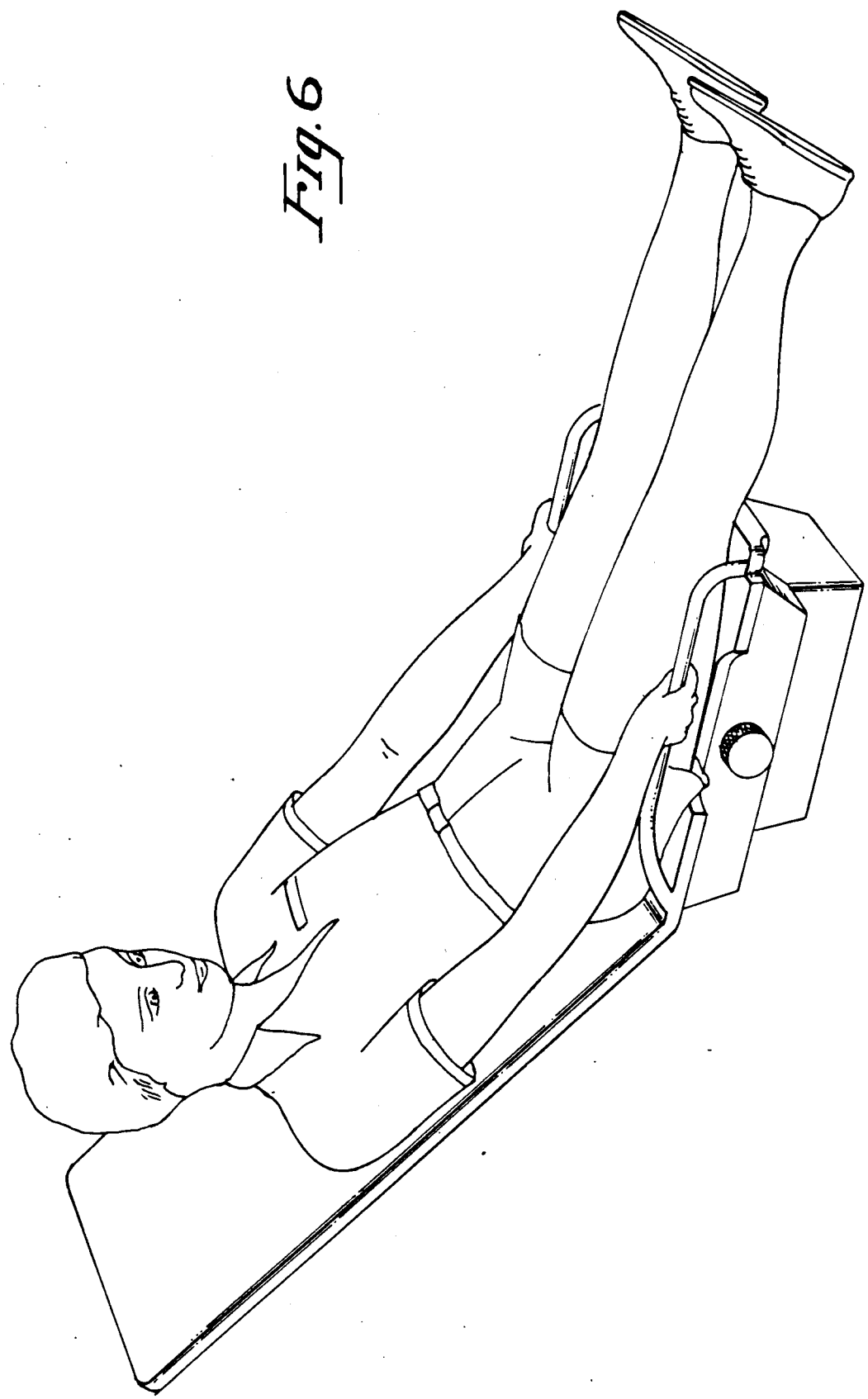
FIG. 6 illustrates the present invention in use by a rider.

Referring first to FIG. 1, it can be seen that the sled 10 of the present invention is made up of a support member 12 having an ice block 14 mounted to it. The support member 12 is a rigidly formed structure which can be made of fiberglass, plastic or some other equivalent material. In the preferred embodiment, the support member 12 is constructed in the shape of a seat so as to allow the rider to sit comfortably. It will be apparent to those skilled in the art, however, that various other designs can be used for the seat without departing from the scope of the present invention. For example, the support member may simply be a flat surface in which the rider lies in a prone position or stands upright. In the preferred embodiment, handholds 16 are provided on both sides of the support member 12 so that the rider may have something to grasp while riding the sled FIG. 6 illustrates the manner in which a user would sit on the sled while it is in use.

Located on the underside of the support member 12 is a means for mounting the ice block 14 on the support member 12. In the preferred embodiment, a clamping mechanism is employed. This mechanism will be described with reference to FIGS. 3 and 5. In the preferred embodiment, a pair of support blocks 20 are located on the underside of the support member 12 adjacent to its edges. The support blocks 20 are made of any suitable material which can be rigidly affixed to the support member 12. Alternatively, they may be formed integrally with the support member. The support blocks 20 extend substantially parallel to the side edges of the support member 12 and have a length approximately equal to the sides of the ice block 14. The support blocks 20 have a threaded hole 21 as shown in FIG. 3 into which a locking screw 18 is placed. The locking screw has a knob 19 located outside of the support blocks which is easily accessibly by the rider. Located adjacent to the support blocks and connected to the locking screw 18 are adjustable compression blocks 22. The locking screw 18, support block 20, and compression block 22 are connected in such a manner that when a rider rotates the knob 19 in one direction the compression block will move towards the center of the support member 12. When the rider turns the knob 19 in the opposite direction, the compression block will move outward.

The ice block is mounted onto the support member 12 by placing it on the bottom side of the support member between the compression blocks 22. Then, the rider turns the knobs 19 so as to firmly hold the ice block in place. As best seen in FIGS. 4 and 5, the support member 12 further includes a rear stop 28 and a front stop 30 on its bottom side. These stops prevent the ice block from moving forwards and backwards relative to the support member. As with the support blocks 20, the front and rear stops may be separately constructed and joined to the support member or they may be formed integrally with the support member.

It will be apparent to those skilled in the art that many different means for mounting the ice block onto the support member 12 can be used without departing from the scope of the present invention. The preferred embodiment has been chosen as it allows the rider to continually adjust the clamping force applied to the ice block 14. This adjustment is preferable because as the sled is used the ice block 14 will melt and become smaller. However, other methods may be used to achieve a similar result. For example, the compression blocks may be spring loaded and automatically move inward as the size of the ice block decreases. Alternatively, the locking screw and adjustable compression blocks can be replaced with a piece of flexible rubber. If this method is used, the ice block will simply be wedged into place between the pieces of compressible rubber and held in place by means of a force fit. As the ice melts and becomes smaller, the pieces of rubber will expand, keeping the ice block in place.

It will be appreciated that the ice block 14 which is used in the present invention is not necessarily restricted to any particular size or shape. Additionally, one or more than one ice block may be utilized. The only limitation is that the ice block should be large enough to have a surface which provides a relatively friction-free interface with the sledding area. Because of the adjustable nature of the clamping means used in the preferred embodiment, a wide-range of shapes and sizes of blocks can be easily accommodated and used with the sled.

In order to provide an ice block 14 of optimum shape and size which is readily accessible to a rider, the present invention contemplates a mold (not shown) which will easily fit in common household freezer. In the preferred embodiment, the mold shapes a block of ice that is specially designed to interface with the sled and the compression blocks. By using the mold, a rider will have pre-made ice blocks which are of optimum size to be used with the sled.

In the foregoing specification, the invention has been described with reference to several specific exemplary embodiments. It will be evident, however, that various modifications and changes may be made in these embodiments without departing from the broader spirit and scope of the invention. The specification and drawings are, accordingly, to be regarded in an illustrative sense and are limited only by the appended claims.

We claim:

1. A sled, comprising:
   a support member adapted to accommodate a rider, said support member having a top side and a bottom side;
   a retention means for removably holding a block of ice on said support member, wherein said retention means comprises at least one support block rigidly connected to said support member and at least one compression member adjustably coupled to said support block, said retention means being connected to said bottom side of said support member.

2. The sled of claim 1 wherein said support block is integrally formed with said support member.

3. A sled, comprising:
   a support member formed in a shape of a seat, said support member adapted to accommodate a rider, said support member having a top side and a bottom side;
   a retention means for removably holding a block of ice on said support member, said retention means being connected to said bottom side of said support member, said retention means being adjustable, wherein said adjustable retention means comprises:
   first and second support blocks, wherein each of said support blocks are rigidly fixed to said bottom side of said seat member adjacent to said side edges thereof, and wherein each of said support blocks have disposed there through a threaded hole;
   a locking screw disposed within each of said threaded holes, said locking screw having a first and a second end; and
   a compression block moveably coupled to said first end of said locking screw, the rotation of said locking screw in a first direction causing said compression block to move toward the center of said support member thereby applying pressure to said block of ice, and the rotation of said locking screw in a second direction causing said compression block to move away from said center of said support member, thereby releasing pressure on said block of ice.

4. A sled comprising:
   a seat member, said seat member having top and bottom sides and first and second side edges;
   first and second support blocks fixedly coupled to said bottom side of said seat member adjacent to said first and second side edges of said seat member respectively, each of said support blocks having located therethrough a threaded hole, said threaded hole being disposed substantially perpendicular to said side edges;
   a locking screw disposed within each of said threaded holes, each of said screws having first and second ends, said screws being oriented such that said second end of said screws are located adjacent to said side edges of said seat member;
   a knob connected to said second end of each of said locking screws;
   a compression block movably coupled to said first end of each of said locking screws;
   a block of ice, said block of ice located adjacent to said bottom side of said seat member and held in place by said compression blocks.

5. The sled of claim 3 wherein said seat member is substantially L-shaped, having a horizontal and a vertical component.

6. The sled of claim 3 wherein said sled further comprises first and second stop members for restricting the forward and backward movement of said block of ice, said stop members being connected to said bottom side of said seat member, said first stop member being located in front of said block of ice and said second seat member being located behind said block of ice.

7. The sled of claim 3 wherein said seat member is made from injection molded plastic 8. The sled of claim 3 wherein said seat member is made from fiberglass.

9. The sled of claim 3 further comprising a mold for forming said block of ice, said mold having a shape such that said block of ice is adapted to fit between said compression blocks.

* * * * *